Figure 1:
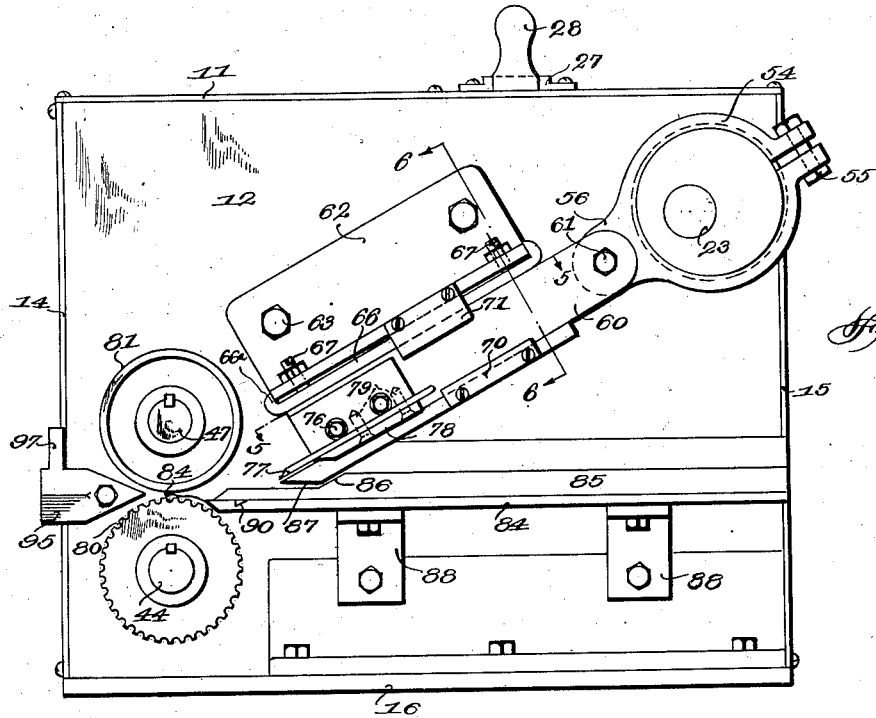

May 28, 1935.  A. J. BEFORD  2,002,486

MACHINE FOR SLITTING WELTS

Filed Aug. 17, 1934   3 Sheets-Sheet 1

WITNESS

INVENTOR
Arthur J. Beford
BY
ATTORNEY

May 28, 1935. A. J. BEFORD 2,002,486
MACHINE FOR SLITTING WELTS
Filed Aug. 17, 1934  3 Sheets-Sheet 2
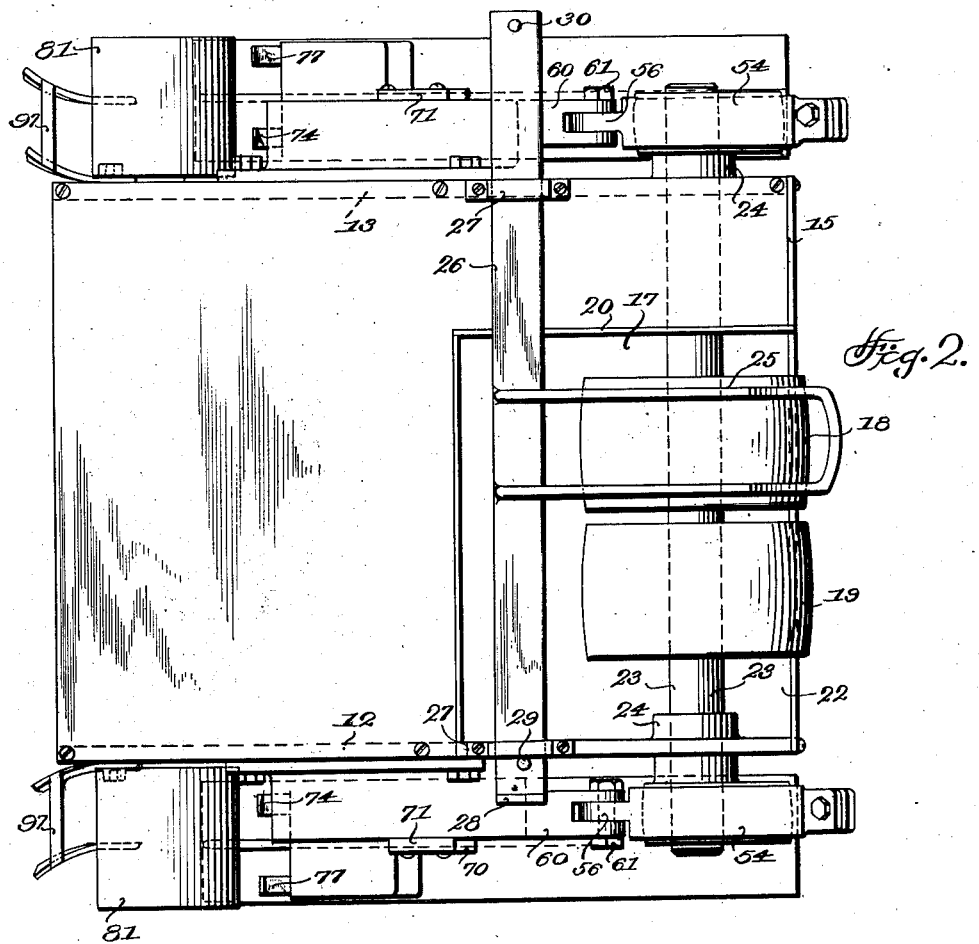
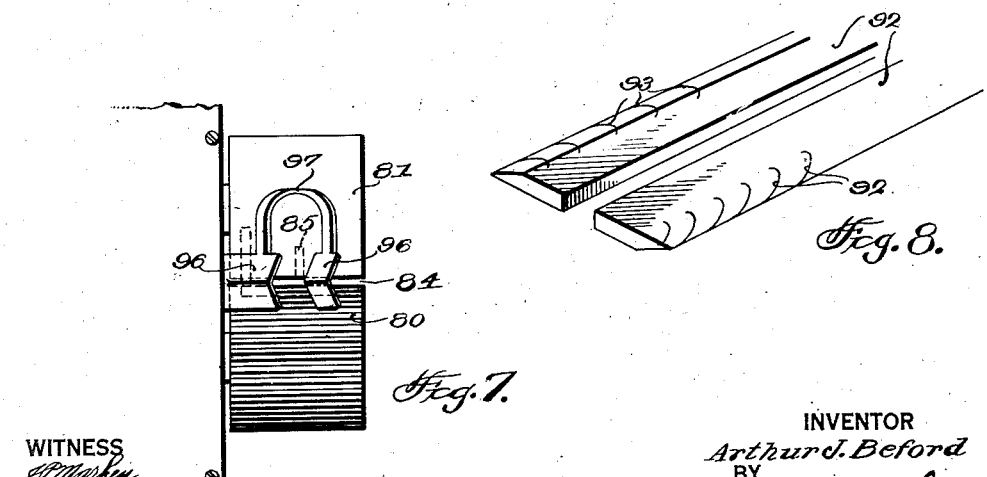
INVENTOR
Arthur J. Beford
BY
Munn, Anderson + Liddy
ATTORNEY May 28, 1935.   A. J. BEFORD   2,002,486

MACHINE FOR SLITTING WELTS

Filed Aug. 17, 1934   3 Sheets-Sheet 3

INVENTOR
Arthur J. Beford
BY
ATTORNEY

Patented May 28, 1935

2,002,486

UNITED STATES PATENT OFFICE 2,002,486

MACHINE FOR SLITTING WELTS

Arthur J. Beford, Littlestown, Pa.

Application August 17, 1934, Serial No. 740,303

3 Claims. (Cl. 164—49)

This invention relates to an apparatus for slitting welts.

An object of the invention is the provision of a device for slitting welts in which a plurality of tracks are provided at opposite sides of a housing for receiving and guiding the welts into a reciprocating knife with means adjacent the knives for moving the welts at a predetermined rate along the path of the reciprocating knives so that the welts will be slit at regular intervals along one edge.

A further object of the invention is the provision of a welt-slitting apparatus in which a plurality of welts may be operated upon simultaneously with means for moving the welts through tracks at a predetermined speed while a plurality of knives are operated in synchronism with the movement of the welts.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Figures 5, 6:
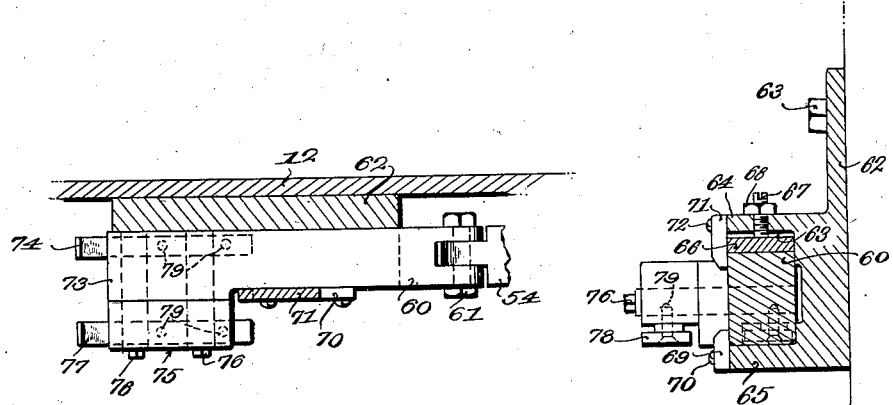
Figure 3:
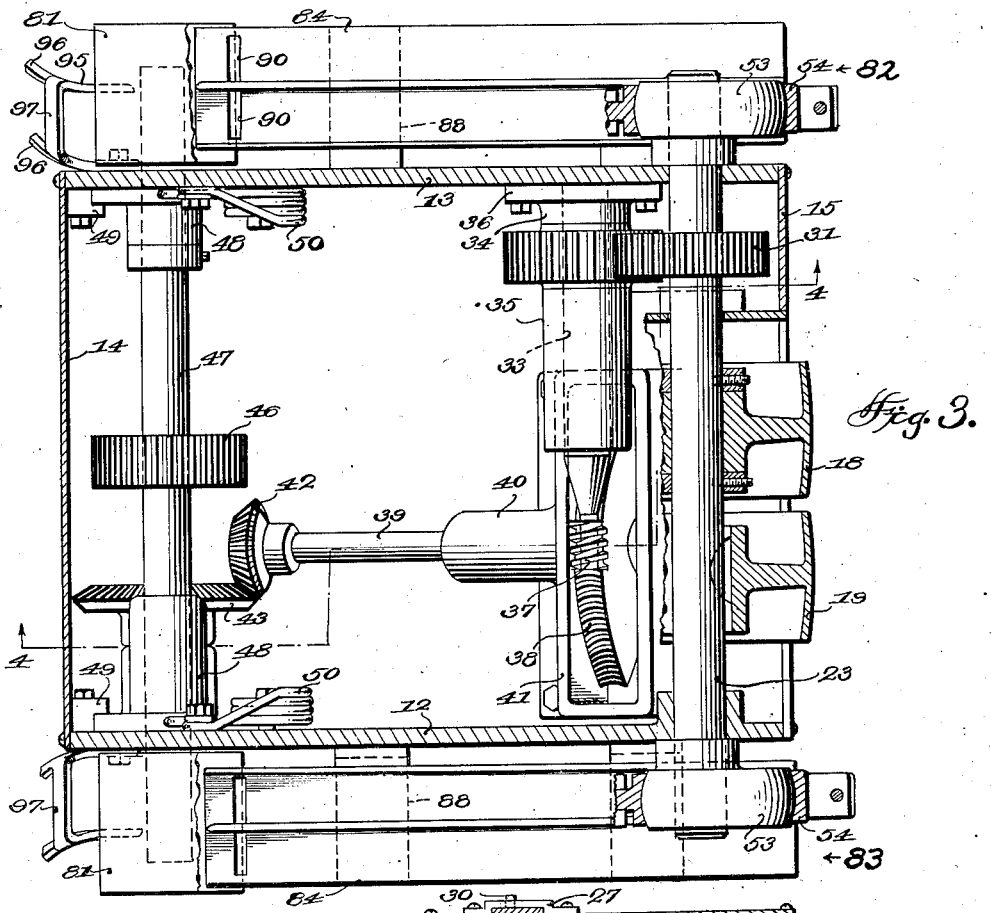
Figure 4:
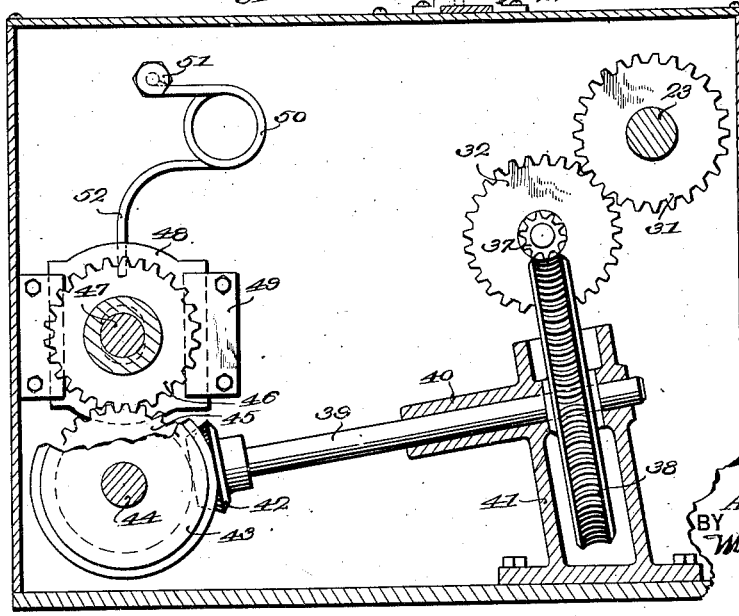

In the drawings:

Figure 1 is a side view in elevation of a welt-slitting apparatus constructed in accordance with the principles of my invention, Figure 2 is a plan view of the same, Figure 3 is a horizontal section of the apparatus, Figure 4 is a transverse vertical section taken along the line 4—4 of Figure 3, Figure 5 is a section through a guide taken along the line 5—5 of Figure 1, and Figure 6 is a transverse vertical section taken along the line 6—6 of Figure 1.

Figures 7 and 8 are detail views.

Referring more particularly to the drawings, 10 designates a housing having a removable cover plate 11, side walls 12 and 13 and end walls 14 and 15. The walls are supported from a bottom portion 16.

The intermediate portion of the end wall 15 is cut away to provide an open chamber 17 in which are mounted pulleys 18 and 19. This chamber is partially enclosed by walls 20 and 21 and the wall 12. The bottom is shown at 22.

A shaft 23 is mounted in bearings 24 formed on the walls 12 and 13 and has secured thereto the pulley 19. The pulley 18 is loose on the shaft. A belt (not shown) is adapted to be normally disposed on the pulley 18 when the machine is in an inoperative condition. A yoke 25 is secured to a sliding member 26 mounted in guides 27. Said yoke is adapted to receive the belt so that when the member 26 is reciprocated it can be moved from the pulley 18 to the pulley 19 and vice versa. A handle 28 projects upwardly from the slide 26 so that the slide may be manually reciprocated. A pin 29 is secured to the slide and is adapted to engage the guide 27 to limit the inward movement of said slide. A pin 30 is secured to the outer end of the slide and is adapted to engage the guide 27 for properly positioning the yoke 25 relative to the pulley 19.

A gear 31 is secured to the shaft 23 and meshes with a gear 32 rigid with a countershaft 33. This shaft is mounted in bearings 34 carried by the side wall 13. A bearing 35 also receives the shaft 33 and is supported by an arm connected with a bracket 36 which carries a bearing 34.

A worm 37 is formed on the end of the shaft 33 and meshes with a worm gear 38. A shaft 39 carried by a bearing 40 is made rigid with the worm gear 38. The worm gear is mounted within a housing 41 which is adapted to contain a lubricant.

A beveled gear 42 is secured to the end of the shaft 39 and meshes with a gear 43 secured to a shaft 44. This shaft is mounted in bearings carried by the side walls 12 and 13.

A gear 45 secured to the shaft 44 meshes with a gear 46 secured to a shaft 47. This shaft is mounted in sliding bearings 48 which are carried by guides 49 secured to the side walls 13 and 14. A spring 50 having one end secured at 51 to the side walls is adapted to have its opposite end 52 pressing against the bearing 48 for maintaining the gears 45 and 46 in mesh and for a purpose which will be presently explained.

The shaft 23 extends through the side walls 12 and 13 and on these projecting ends are secured eccentrics 53 which are revolved by said shaft. An eccentric strap 54 embraces the eccentric 53. The outer ends of the straps are bolted together, as shown at 55. The inner ends of the straps are combined into a cross head 56.

A reciprocating member generally designated by the numeral 60 is pivotally connected to the cross head, as shown at 61. This reciprocating member extends downwardly at an angle and it will be noted that there is a reciprocating member at each side of the housing and a description of one reciprocating member and its associated mechanism will be sufficient.

A guide is provided for the reciprocating member and consists of a plate 62 which is bolted at 63 to a side wall and has a cut-out portion 63 adapted to receive the reciprocating member or cross head 60. The cut-out portion provides a pair of parallel flanges 64 and 65.

An adjusting plate 66 is carried by screws 67 which are retained in place by nuts 68. These screws or bolts pass through the flange 64 and engage the outer face of the plate 66. The inner face of the plate is in engagement with the upper edge of the cross head 60.

A bar 69 is secured at 70 to the outer edge of the flange 65. A bar 71 is secured at 72 to the outer edge of the flange 64 so that the inner edges of these bars will engage the outer face of the cross head 60 and maintain said cross head in position during reciprocation.

The lower end of the cross head is provided with a block 73 having a knife 74 secured to its underface. A block 75 is bolted at 76 to the block 73 and has secured to its underface a knife 77. Securing plates 78 may be employed upon the outer faces of the knives through which bolts 79 are passed and threaded into openings in the respective blocks. The knives have openings or slots to receive the bolts 79.

The shaft 44 has its ends projecting through the side walls 12 and 13 and has secured thereon a toothed pulley 80 and a pulley is located outwardly of each side wall and adjacent the lower edge of the knives 74 and 77. A smooth-face pulley 81 is secured to each outer projecting end of the shaft 47 and is adapted to be located in close association with the pulley 80 so that as the welts are fed between the pulleys the revolving pulleys will move the welts at a predetermined speed in synchronism with the reciprocating knives 74 and 77 in order to slit the welt diagonally across the inner edge at predetermined spaced intervals.

A pair of tracks 82 and 83 are formed by plates 84 and longitudinally disposed partitions 85 and the plates 84 are secured to the side walls 12 and 13 of the housing. The partition 85 is cut away as shown at 86 to receive the extreme lower end 87 of the flange 65 on the supporting plate 62. It will be noted that the knives 74 and 77 are located upon opposite sides of the partition 85. The plate 84 is supported by brackets 88.

The plate 84 is provided with notches 90 adapted to receive the cutting edges of the knives 74 and 77 as shown in Fig. 1 and at the downward limit of movement of said blades. In other words, when the knife cuts through the beveled edge 91 of the welts 92 to form slits 93 it must pass entirely through the welts and the notches 90 are of sufficient depth to receive the knives without permitting the knife edges to engage the walls of the notch.

A guide member, generally designated by the numeral 95, has outwardly bent flanges 96 adjacent one end of the plate 84 to receive and guide the welts in the tracks 82 and 83 and maintain the welts 92 in alignment with the knives. These tracks are connected together by means of a yoke 97.

The adjusting plate 66 is shown more particularly in Fig. 1 and is provided with upturned flanges 66a in engagement with the outer ends of the flange 64 for aiding in guiding the plate in its movement towards or away from the slide or reciprocating member 60.

The operation of my device is as follows: It will be noted that at each side wall 12 or 13 is mounted a reciprocating member carrying pairs of knives for slitting the welts and the welts are fed in through a pair of tracks to the knives and are pulled along at a predetermined speed by the co-operatively-associated rollers 80 and 81 at each side of the housing. When the pulley 19 is driven by the shifting of the belt from the pulley 18 to the pulley 19, the shaft 23 is revolved, causing the eccentrics 53 to reciprocate the slide 60 and to cause reciprocation of the knives through the welts 92 as they are fed along the tracks 82 and 83 and are pulled forwardly at a predetermined speed by the wheels 80 and 81. The spring-pressed bearings 48 for the shaft 47 permit the wheels 81 to be elevated or lowered, depending upon the thickness of the welts.

Means (not shown) is provided for lubricating the various moving parts.

By the proper slitting of the welts and at a predetermined angle these welts may be curved around the sole and sewed thereto, thereby eliminating bulging portions which will occur when the plain welts are secured in position on the soles.

I claim:

1. A welt-slitting machine comprising a housing, an inclined guideway supported at each side of the housing, said guideway including a plate having spaced laterally projecting flanges, an adjusting plate associated with one flange, means carried by said flange for causing adjustment of the plate, a slide in the form of an elongated bar mounted for reciprocation between the plate and the other flange, a bar secured to the outer edge of each flange and engaging the slide, knives secured to the lower end of the slide, means for causing reciprocation of the slide, rollers located in spaced relation adjacent the knives and tracks associated with the rollers for guiding the welts beneath the knives, said rollers adapted to pull the welts along the tracks.

2. A welt-slitting machine comprising a housing, an inclined guideway supported at each side of the housing, said guideway including a plate having spaced laterally projecting flanges, an adjusting plate associated with one flange, means carried by said flange for causing adjustment of the plate, a slide in the form of an elongated bar mounted for reciprocation between the plate and the other flange, a bar secured to the outer edge of each flange and engaging the slide, knives secured to the lower end of the slide, means for causing reciprocation of the slide, roller means for feeding the welts beneath the knives, and means operatively connected with the reciprocating means for causing rotation of the rollers in timed relation with the reciprocation of the knives.

3. A welt-slitting machine comprising a housing, an inclined guideway supported at each side of the housing, said guideway including a plate having spaced laterally projecting flanges, an adjusting plate associated with one flange, means carried by said flange for causing adjustment of the plate, a slide in the form of an elongated bar mounted for reciprocation between the plate and the other flange, a bar secured to the outer edge of each flange and engaging the slide, knives secured to the lower end of the slide, means for causing reciprocation of the slide, roller means for feeding the welts beneath the knives, means operatively connected with the reciprocating means for causing rotation of the rollers in timed relation with the reciprocation of the knives, means for loosely mounting one of the rollers, and means for urging said roller towards the associated roller.

ARTHUR J. BEFORD.